INVENTORS.
KINGO KOBAYASHI
KOJI NISHIZAWA

United States Patent Office 3,737,509
Patented June 5, 1973

3,737,509
FILM CASTING PROCESS
Kingo Kobayashi and Koji Nishizawa, Kanagawa, Japan, assignors to Fuji Photo Film Co., Ltd., Kanagawa, Japan
Continuation-in-part of application Ser. No. 700,836, Jan. 26, 1968. This application Apr. 28, 1970, Ser. No. 32,762
Claims priority, application Japan, Jan. 26, 1967, 42/5,235
Int. Cl. B29d 7/02, 7/22
U.S. Cl. 264—212                                    2 Claims

ABSTRACT OF THE DISCLOSURE

Extruding liquid film forming material onto a moving, curved supporting surface at a position where the curve supporting surface is both upwardly facing and upwardly moving wherein the said material contacts said surface with the angle between a tangent at said supporting surface at said position and horizontal in the direction of support surface travel being between 30° and 60°.

---

This application is a continuation-in-part of application Ser. No. 700,836, filed Jan. 26, 1968, entitled "Film Casting Process," and now abandoned.

This invention relates to a process of casting films. More particularly, it is concerned with a process by which a film is formed from a solution of film forming material, such as cellulose ester in a solvent or from a melt of thermoplastic resin, such as polyester. Processes for casting films are well known, especially films employed as the film base for photography or films used as packaging material. In such conventional processes, a melt or solution of resin material is applied to a moving support, such as an endless belt or a drum in the form of a thin film. The film is set or solidified by cooling the same or evaporating a solvent which is contained in the thin film, during which the support makes substantially one revolution. The resulting film is then stripped from the surface of the support.

The foregoing processes are preferably carried out as fast as possible and in such a manner that no variation in thickness or film scratches occur. However, it is difficult to satisfy either of these requirements.

One reason is that, in the case of using air currents for cooling or evaporating of the solvent, the influence of the pressure due to the moving air extends to the formed film. In the above-identified apparatus, an extrusion slit is ordinarily provided at a suitable space from the moving support. A melt or solution of resin material flows out of the extrusion slit in the form of a thin film and drops through the space between the extrusion slit and the support falling onto the surface of the support. The wind pressure acts on the liquid film as its drops through the space, the liquid film being oscillated prior to contacting the surface of the support and moves therefore with both nonuniform speed and thickness. Consequently, the film, which is thus formed, has an unevenness in thickness mainly in a direction at right angles to the motion of the support. With an increase in velocity of the film support and an increase in velocity of the air current used in cooling the same, the unevenness in thickness of the resulting film product is quite marked.

A second reason for unevenness in thickness of the resultant film product is that when the liquid film reaches a surface of the support, ambient gas is trapped within the interface formed between the liquid film and its support. This phenomenon is provided more by the entrance of the ambient gas which runs along the surface of the support as a result of movement of the support and therefore, this particular phenomenon is also intensified with the increase in processing speeds. This further results in an unevenness in thickness having a component in the direction which is at right angles to the motion of the supporting surface. This phenomenon may reach such a stage that a thickness variation appears in a direction parallel to the motion of the support and if highly accentuated, the gas may move to such an extent between the surface of the support and the liquid film that acceptable operation of the film making apparatus is impossible.

A third reason for causing unevenness in the thickness of the product is based on the fact that the disturbance of the ambient gas in the film formation area also affects the liquid film material as it flows out of the extrusion slit. This phenomenon promotes evaporation of the solvent from the film forming material solution and forms a solidified substance in the extrusion slit. This solidified substance acts as a blocking influence on the flow of liquid film, resulting in a variation in thickness in the formed film in the direction of movement of the support. In the case of formation of a film from a film forming material melt, the disturbance caused by the ambient gas exerts an unfavorable and nonuniform cooling action on the liquid film which results in defects being formed within the film.

As a method of coping with the foregoing difficulties, it has been proposed to seal the film forming portion of the apparatus in a gastight manner with respect to the other portions of the film manufacturing apparatus. This approach makes it possible to cut off the influence of wind pressure from the applied film, while suppressing the gas entering with the motion of the moving support member and to thereby suppress evaporation of the solvent from the liquid film material which flows out of the extrusion opening, while at the same time, retaining the necessary heat carried by the extruded film. While this approach overcomes some of the troubles, the troubles are not overcome sufficiently and the means offering the solution to the problem causes additional disadvantages to arise.

First, it is very difficult to install an effective gastight sealing device to the moving support member of the present structure. The support is not permitted physical contact with the gastight sealing element and in operation of the film making device it is desirable to maintain a clearance as large as possible between the support and the gastight sealing element or elements.

Where an endless belt is used as the moving support, it becomes more difficult to provide gastight sealing elements or other means, because the position of the endless belt varies at each moment during the operation of the film making plant. Generally, an endless belt is supported by two spaced cylinders with the revolving portion generally in a direction vertical to the main direction of movement of the belt. Moreover, the portion in contact with the supporting cylinder is not flat but is bent or curved since it is in contact with the rotating cylinder. The degree of curvature, of course, varies at each moment of the operation. Therefore, in order to avoid troubles due to possible contact of the gastight sealing element with the endless belt, the former must be installed at a position sufficiently distant from the endless belt. That is to say, the gastight sealing element does not perform a truly gastight seal. The gastight sealing method described above has no positive effect of eliminating the ambient gas at the interface between the liquid film and the moving support. Although the gastight element is installed at the position where the support receives the liquid film and acts, to some degree, to suppress disturbances to the ambient gas which moves along the surface of the support with the motion of the same, it has no direct affect on the elimination of the gas at the interface which reaches this point of contact.

Furthermore, in some cases, the provision of the gastight seal in the area of the film forming portions of the apparatus unfavorably affects the atmosphere, that is, the gas concentration and/or temperature at the film forming area. Where the film is formed from a solution, for example, the gastight seal in the area of the film making portion of the apparatus causes a rise in the gas concentration around the extrusion slit. This has the effect of preventing the formation of a solidified substance in the area of the extrusion slit, but if the rise in gas concentration reaches too great a degree, there appears, quite often, the formation of dew inside the film forming portion of the apparatus due to condensation of the solvent gas. Obviously, if the formed dew drops onto or gets into the formed film, the resulting film is spoiled. In order to prevent this trouble, it is necessary to control the gas concentration, temperature, etc. Alternatively, it has been proposed to keep the pressure negative near the area in which the liquid film contacts the moving supporting surface. Under this proposed method, a positive effect may be expected due to the elimination of the ambient gas in the interface between the liquid film and the moving surface of the support, and also the suppression of oscillation of the liquid film which, due to the negative pressure, drops freely from the extrusion slit onto the surface of the moving support. However, this method cannot avoid troubles of operation and other disadvantages. First, it is required that a very complicated apparatus be installed and precisely maintained to reach the desired negative pressure. There are great restrictions on the operating conditions and if the conditions are not proper, there is often an increase in thickness variation of the formed film. Furthermore, it is very difficult to keep the ambient conditions in the area of the extrusion slit constant, both in terms of temperature and gas concentration.

It has been further proposed to employ a blower or other means to cause a positively moving air current to impinge upon the slit of the extruder with the temperature and gas concentration of the airstream being adjustable and to thereby control directly the atmosphere in the neighborhood of the extrusion slit. This method has a positive effect on the extrusion slit to prevent the formation of a solidified substance within the slit, while preventing cooling fluctuations. However, this method also has the disadvantage of requiring additional plant mechanism and means for controlling the operation of the same. In some cases, the dew which is detrimental to the final film product may condense on either the liquid film forming part or the additional blower apparatus.

It is, therefore, an object of the present invention to overcome the disadvantages of the prior art film forming methods.

It is another object of this invention to provide a method and apparatus for achieving the formation of film as fast as possible and in such a manner, that the thickness of the film is constant, while preventing the occurrence of scratches in the formed film.

It is a further object of this invention to provide an improved method of extruding film which is more effective than the prior art methods where the film forming portion of the apparatus is effectively protected from oscillation or vibration by wind pressure and where the ambient gas may be readily eliminated from the interface between the liquid film and the surface of the support which receives the same.

It is a further object of this invention to provide an improved method of forming thin film in which the formation of a solidified substance from the film forming solution may be prevented in or around the extrusion slit and in which even cooling of the extrusion melt is achieved.

Such objects can be accomplished by adjusting the position of the film forming portion of the apparatus with respect to the moving support such that the solution or melt of resin material which flows out of the extrusion slit is led to the surface of the support at a point where the surface slants upwardly and the direction of movement is upwardly.

The film making process of this invention consists in making a film by the steps of flowing a liquid resin material out of an extrusion slit and forming the same as a film on the moving support with the film subsequently solidifying. The position where the formed film of liquid resin material reaches or contacts the surface of the moving support is adjusted to the point where a surface of the support is directed slantwise, that is, at an angle and upwards, while the moving direction of the support surface is also upwards and at a slant. The support consists of a revolving cylindrical surface or an endless belt carried by a revolving cylindrical surface. The rotary shaft for the cylindrical surface or surfaces is generally horizontal and the support is thus moved in all directions from horizontal to vertical while making one revolution. This is to be contrasted to the prior art wherein the formed film contacts the moving surface at a point where the moving support surface is oriented horizontally, that is, near or at the top of its rotative path within the film manufacturing system.

In the process of the invention, the film forming part is arranged at a position which is back of or reverse to the moving direction of the support from the top of the film making apparatus. Thus, the liquid film in moving from the extrusion slit to the moving support surface, is subject to an external force which is opposite in direction or reverse to the moving direction of the film support surface, this force comprising a component of gravity acting against the film. This external force, created by gravity, has the effect of suppressing vibration of the film due to the internal force of the film and the external force of wind pressure, etc., as well as promoting the elimination of the gas which normally occurs at the interface where the liquid film contacts the surface of the moving support. This may be understood from the fact that the component of gravity plays the same role as the prior art proposal; that is, the proposal in which the pressure is maintained negative near the area where the support moves into the line of contact with the falling film. In accordance with the process of the present invention, the film manufacture may be carried out at a high speed with little resulting variation in film thickness.

In the region directly beyond the point or line or contact between the falling film forming material and the moving support surface, the ambient gas whose content of salt rises as a result of the solvent being evaporated from the flowing film, or whose temperature is lowered by the cooling action of the film forming apparatus, causes the density of the flowing product to be raised. The film, therefore, moves downwardly along the surface of the support by the action of a component of gravity, that is, reversely to the direction of movement of the film receiving surface. Accordingly, the liquid film near the extrusion slit or that portion of the liquid film from the extrusion slit to the support reaching point is subject to an air current having a relatively high concentration of solvent gas and a suitable temperature. This air current has the effect of suppressing the formation of a solidified substance from the solution within the slit itself, while suppressing uneven cooling and the occurrence of a variation in resulting film thickness.

Where an endless belt acts as the support and two inscribed cylinders are arranged horizontally for supporting the same and driving the endless belt, in accordance with the process of the present invention, the endless belt is in contact with the cylindrical surface over some region on both sides of the film forming portion of the apparatus. Since, in this region, the endless belt is held as a constant curved surface in contact with the cylindrical surface, the provision of a gastight sealing element or elements in the area of the support provides a highly efficient sealing effect.

The present invention is illustrated by the accompanying drawings, wherein.

Figure 1:
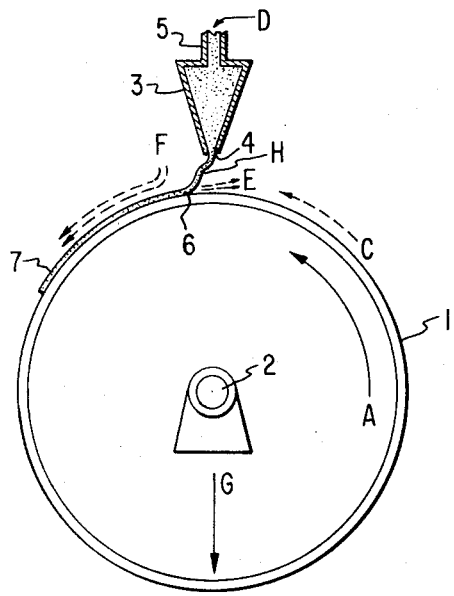
FIG. 1 is a diagrammatic illustration of an apparatus employing a prior art process for extruding thin film on a rotary drum.
Figure 2:
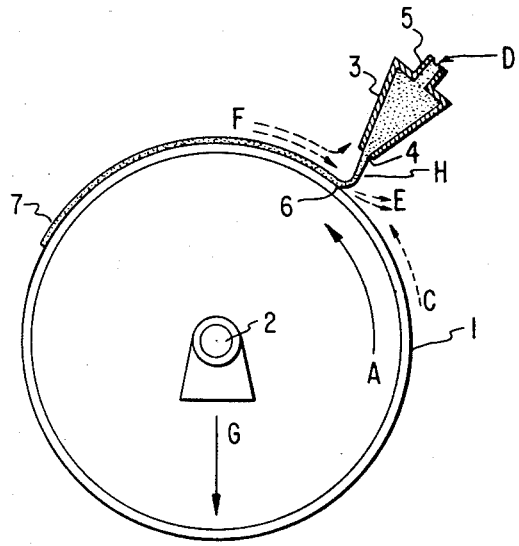
FIG. 2 is a diagrammatic illustration of one embodiment of the present invention employing a rotary drum or cylinder as the film receiving support surface.

Referring to the drawings, FIGS. 1 and 2 show the employment of revolving drums or cylinders as the moving support in an extruded film manufacturing apparatus, although other types of support may be used. The drum or cylinder 1 revolves about shaft 2 in the direction of arrow A but is driven by suitable means (not shown). The temperature inside the surface of the moving support 1 is controlled by suitable means (not shown), while the atmosphere; that is, its temperature, if necessary, and the flow of ambient gas is controlled by suitable means (not shown). The film making solution or melt D which is prepared by suitable means (not shown) enters the die 3 through feed pipe 5 and is converted into a flowable liquid film 8 by extrusion slit 4, the film 8 being led to the surface of support 1 and contacts the same along a line indicated at 6. The liquid film 7 in contact with the surface of the support 1, revolves therewith and is solidified by cooling or by evaporation of a solvent contained therein and is then stripped from the surface of the support 1. In the prior art method, as shown in FIG. 1, vibration of the ambient gas in the vicinity of the extrusion slit gives an uneven pressure to the liquid film 8 as it flows down from the slit 4 and vibrates the same. The action of the ambient gas C, as identified by the dotted arrow, in reaching the line of contact 6 or position of contact between the extruded film material and the moving support 1 and the discharge resistance of the ambient gas E from between the support 1 and film 7 at the interface defined by line 6, hinders the formation of a stable liquid film 7. In the known process (FIG. 1), the extrusion slit 4 is arranged substantially vertically, that is, normal to the circumference of support 1 (direction of action of gravity shown by arrow G) and the moving direction of the surface of the support 1 is substantially horizontal or in that neighborhood. In this state, the line of contact between the film and the moving surface is somewhat shifted downstream from slit 4 and consequently, the length of the liquid film H which is flowing from the slit is thus increased, thereby enhancing the instability of the film. The ambient gas, whose gas concentration is raised by the evaporated solvent from the formed film 7, and other effects and/or whose density is raised by cooling, is mainly flowing along the film in the direction of the moving support 1 and not toward the extrusion slit 4 (arrow F).

Where the apparatus is used in the process of the present invention, the extrusion slit 4 (FIG. 2) is positioned such that it opposes the surface of the support which is moving slantwise and upwardly. In this state, the position of the film contact line 6 comes near the extrusion slit 4 under the action of gravity (arrow G) and because of the direction of movement of the support surface 1 to a greater extent than in the prior art process and thus, the length of the liquid flowing from the slit prior to contacting the moving surface, as identified by film H, is thus shortened. Gravity acting on the liquid film H exerts an effect of discharging the ambient gas E along the line of contact 6 and the stability of the liquid film H is remarkably improved over that of FIG. 1. Gas F, whose density rises, is moving in a reverse direction to the direction of movement of the support surface 1, this gas constituting an air current flowing toward the extrusion slit 4 which exerts an effect to increase the stability of the liquid film H and prevent troubles in extrusion of the same through slit 4. The harmful air current C which moves reversely toward the line of contact 6 is generally cooled by the surface of support 1 and the density thereof is raised. The air current is then subject to a force reversal due to gravity in the direction of arrow C, the flow thereof being converted favorably.

Figure 3:
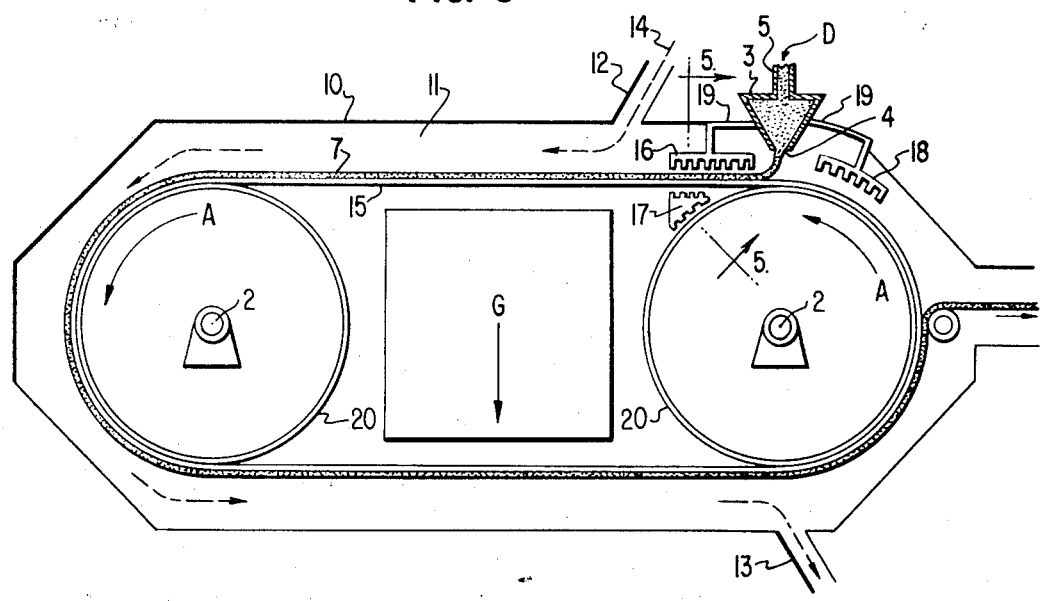
FIG. 3 is a diagrammatic illustration of an apparatus including an endless belt as the moving supporting surface employing a prior art film forming process.
Figure 4:
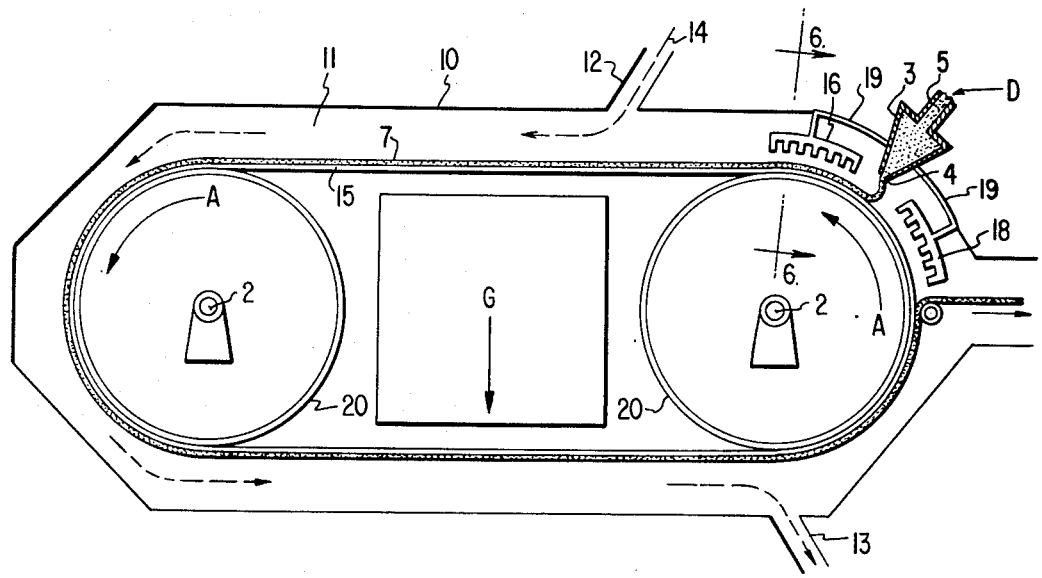
FIG. 4 is a diagrammatic illustration of an alternate embodiment of an apparatus employing the process of the present invention.

Referring to FIGS. 3 and 4, an endless belt acts as a support for the formation of an extruded film with the film forming portion of the apparatus being provided with a gastight seal or part. In each case, two cylindrical surfaces 20, 20 revolve in the direction of arrow A and are supported by shafts 2, respectively, the cylindrical surfaces receiving endless belt 15 which forms the moving support surface. This assembly is enveloped in a wind channel 11 formed of wall material 10, into which is introduced a gas current, indicated at 14, for controlling the temperature and for removing the solvent gases, the gas current being introduced through gas inlet 12. The gas current is circulated in the wind channel 11 and exhausted through gas outlet 13. Cylindrical surfaces 20 are subjected to suitable temperature controlling means (not shown). The film making solution or melt D enters die 3 from feed pipe 5 and is extruded through extrusion slit 4 to form a film 7 which is deposited on moving support 15. The film 7 revolves with the support 15 and after solidification is stripped therefrom. The film forming part or portion of the apparatus includes a gastight chamber comprising die 3, casing 19, seal elements 16 and 18 and support 15.

Since in the known process (FIG. 3), die 3 is arranged vertically above the cylindrical surface 20 (with the direction of action of gravity being shown by arrow G), that is, near the position where the endless belt 15 leaves the cylindrical surface 20, the seal element 17 must be provided between the endless belt 15 and the cylindrical surface 20 to accomplish the desired sealing function. In the process of the invention as applied to the modified apparatus of FIG. 4, on the other hand, a sufficient gastight effect or seal is given without the provision of sealing element 17.

Figure 5:
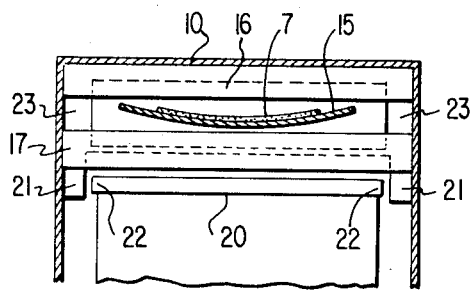
FIG. 5 is a cross-sectional view of a portion of the apparatus shown in FIG. 3 taken about lines 5—5.
Figure 6:
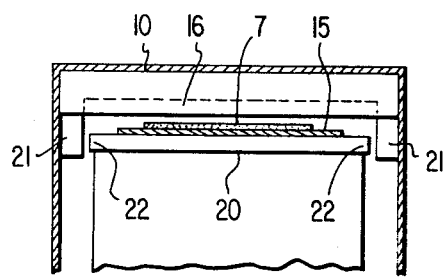
FIG. 6 is a cross-sectional view of a portion of the apparatus shown in FIG. 4 taken about lines 6—6.

FIGS. 5 and 6 illustrate the effect of such a gastight sealing element which illustrate, in cross-section, portions of FIGS. 3 and 4, the sectional view passing through seal element 16, respectively.

In the known process, as exemplified by FIG. 5, support 15 being apart from the cylindrical surface 20 is bent into the curvature which varies with operating conditions, the whole of the support surface 15 being oscillated in the direction of right to left during the operation so it is necessary to form the gap between the support 15 and seal elements 16 and 17 or 23 which is quite large. In addition, the sealing elements 17 and 21 must be provided between the supporting surface 15 and the cylindrical surface 20 at its side 22. In this known prior art process, as evidenced by the sectional view of FIG. 5, the cross-section of the non-gastight portion of the apparatus is remarkably large.

In employing the process of the present invention with the modified apparatus of FIG. 6, on the other hand, the moving support surface 15 is in close contact with the cylindrical surface 20 and is held in constant position so that seal elements 16 and 21 may be provided such that they are closely adjacent to the cylindrical surface and its sides 22, respectively. Accordingly, the cross-section of the non-gastight portion of the apparatus is made much smaller than in the apparatus employing the known process.

Figure 7:
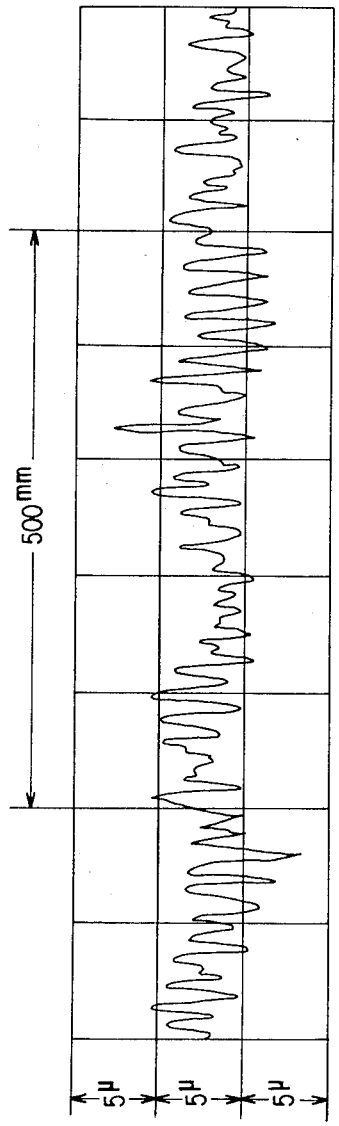
FIG. 7 is a plot of the thickness fluctuation curve for film articles obtained by the prior art processes employing the apparatus of FIGS. 1 and 3.
Figure 8:
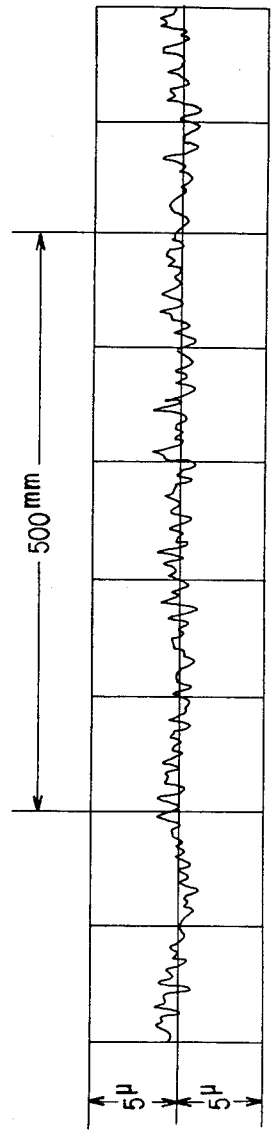
FIG. 8 is a plot of thickness fluctuation curves for film articles obtained by the process of the present invention employing either the apparatus of FIGS. 2 or 4.

FIGS. 7 and 8 show curves representative of the cross-sectional shape of the film in its direction of manufacture. FIG. 7 shows the fluctuations of thickness of the film produced by the prior art apparatus of FIG. 3 while FIG. 8 shows the fluctuations of thickness of the film produced by modification of applicants' invention as shown in FIG. 4 when the following casting parameters were used with both the apparatus:

Film making solution
  methylchloride, solution of cellulose triacetate,
  temperature: 30° C.
  viscosity: 800 poise
Average thickness of formed film: 0.135 mm.
The velocity of the moving support surface: 15 m./min.

From a comparison of FIGS. 7 and 8, it is obvious that the process of the present invention has a marked effect in reducing the width of fluctuation in film thickness to approximately one-third over that of the prior art. Furthermore, since the only difference between apparatus of FIGS. 3 and 4 is in the placement of extruder slit this placement is believed to be the cause of the better results from the apparatus of FIG. 4.

While only a single set of casting parameters have so far been discussed, it has been found that a significant reduction in film thickness fluctuation can be achieved over the following ranges of casting parameters:

(a) Viscosity of the film forming material 100–10,000 poise
(b) Casting support speed .5–50 m.min.
(c) Extrusion rate of film forming material .02–2 times casting support speed
(d) Distance between extrusion slot and casting support .5–5 mm.

In the apparatus shown in FIG. 4 the extrusion slit faces a portion of the cylindrical surface which is more than 200 mm. from the top of the cylinder surface as measured along that surface. Such a placement of the extrusion slit on the apparatus shown in FIG. 4 positions a tangent at the point of contact between the film and the moving support surface at an angle of 20 to 70°, and more specifically, 30 to 60° from the horizontal with the surface of the support being directed vertically and upwardly. Of course, for a cylindrical surface of a different size a different positioning of the extrusion slit will be required to keep the angle between the film and the cylindrical surface within the permissible range 20–70°.

It will be understood from the foregoing illustrations that film having a more uniform thickness can be readily produced and the production thereof can be accomplished with high efficiency under a stable operating condition. These advantages are available, in particular, for the production of a film base for photography, requiring excellent optical and mechanical characteristics.

What is claimed is:

1. In a film coating process comprising the steps of applying a liquid film forming material to a surface of a support continuously moving at .5–50 m./min. from an extrusion slit spaced therefrom between .5–5 mm., solidifying the resulting film, and stripping the same from said surface, the improvement comprising: moving said support in an upward direction at the position where said material contacts said surface with the angle between a tangent at said support surface at said position and horizontal in the direction of support surface travel being between 30° and 60°, whereby the force of gravity acts in a direction diametrically opposed to the wind force applied to the film forming material between the extrusion slit and the moving support surface which suppresses vibration of the film and thus improves the uniformity of the film thickness.

2. In a film coating process comprising the steps of applying a liquid film forming material to a surface of a support continuously moving at .5–50 m./min. from an extrusion slit, said liquid film forming material being applied from the extrusion slit at a rate between .02–2 times the speed of the supporting surface spaced therefrom between .5–5 mm., solidifying the resulting film, and stripping the same from said surface, the improvement comprising: moving said support in an upward direction at the position where said material contacts said surface with the angle between a tangent at said support surface at said position and horizontal in the direction of support surface travel being between 30° and 60°, whereby the force of gravity acts in a direction diametrically opposed to the wind force applied to the film forming material between the extrusion slit and the moving support surface which suppresses vibration of the film and thus improves the uniformity of the film thickness.

References Cited
UNITED STATES PATENTS

| | | | |
|---|---|---|---|
| 3,038,209 | 6/1962 | Hunter, Jr. et al. | 264—176 |
| 3,423,493 | 1/1969 | Klenk et al. | 264—176 |
| 2,688,155 | 9/1954 | Nadeau et al. | 264—212 |
| 3,112,528 | 12/1963 | Czerkas | 264—212 |
| 2,203,596 | 6/1940 | Konig | 264—207 |

ROBERT F. WHITE, Primary Examiner

J. R. THURLOW, Assistant Examiner

U.S. Cl. X.R.

264—216